United States Patent [19]

Fukuhara

[11] 4,171,154

[45] Oct. 16, 1979

[54] TTL METERING DEVICE IN A SINGLE LENS REFLEX CAMERA

[75] Inventor: Toru Fukuhara, Isehara, Japan

[73] Assignee: Nippon Kogaku K.K., Tokyo, Japan

[21] Appl. No.: 900,795

[22] Filed: Apr. 27, 1978

[30] Foreign Application Priority Data

Apr. 28, 1977 [JP] Japan .............................. 52/53281[U]

[51] Int. Cl.² .......................... G03B 7/08; G03B 19/12
[52] U.S. Cl. .................................. 354/23 R; 354/152
[58] Field of Search ..................... 354/23 R, 22, 23 D, 354/152–156, 150, 151, 59

[56] References Cited

U.S. PATENT DOCUMENTS 2,980,001  4/1961  Sauer et al. ........................... 354/155
4,110,765  8/1978  Miyata et al. .......................... 354/59

FOREIGN PATENT DOCUMENTS 2639199  3/1977  Fed. Rep. of Germany ........ 354/23 R
1465439  12/1966  France ..................................... 354/152

Primary Examiner—Donald A. Griffin
Attorney, Agent, or Firm—Shapiro and Shapiro

[57] ABSTRACT

A TTL metering device in a single lens reflex camera for measuring light passed through the picture-taking objective lens of the camera is disclosed. The TTL metering device comprises a light-sensing element for receiving the light and producing an output corresponding to the intensity thereof, a swing-up mirror rotatably movable between its first and second positions and a light reflecting means disposed behind the swing-up mirror. In order to broaden the distribution of sensitivity of the light-sensing element and also to keep the output thereof optimum, the light reflecting means is particularly designed. The light reflecting means comprises a reflection area composed of a plural number of mirrors regularly arranged and having directionally different reflecting characteristics and a light concentrating area disposed around the reflection area and formed by a plural number of ring mirrors arranged in a fashion of concentric circles, which light concentrating area has light concentrating and reflecting characteristics. The light reflecting means directs the light passed through the objective lens and the light-transmitting area of the swing-up mirror toward the light-sensing element.

8 Claims, 12 Drawing Figures

TTL METERING DEVICE IN A SINGLE LENS REFLEX CAMERA

BACKGROUND OF THE INVENTION

1. Field of the Invention

The present invention relates to a TTL (Through The Lens) metering device in a single lens reflex camera and more particularly relates to such type of TTL metering device which comprises a swing-up mirror adapted for a finder and at least partly having a light transmitting area therein, a light receiving system including a light-sensing element and a second mirror for directing light passed through the light transmitting area toward the light receiving system.

2. Description of the Prior Art

Between the above described type of TTL metering device and another conventional type of TTL metering device comprising a finder screen disposed before its light receiving system there is a difference in metering characteristics for exposure setting at opening aperture or at stopping down. This difference is caused by the fact that the light receiving system of the latter has a broader distribution of sensitivity than that of the former owing to the finder screen and other additional element contained in the light receiving system of the latter. This difference in metering characteristics becomes inconvenient when it is desired to use one and the same interchangeable lens in common for both of two cameras, one equipped with the first mentioned type of TTL metering device and another with the second mentioned one.

A solution to the problem is disclosed in Japanese patent application laid open No. 17,817/1977 (corresponding to DOS No. 2,627,248), which is characterized by the provision of a diffusing surface on the semitransparent portion of a swing-up mirror or on a second mirror.

While this solution may have an effect to broaden the sensitivity distribution, a large portion of effective light which otherwise would be received by the light receiving system is diffused away by the diffusing surface at the same time. Therefore, the solution has a disadvantage that the output of the light-sensing element drops down.

On the other hand, it is unallowable to enlarge the second reflecting mirror so much because it must be retracted to its second position out of the light path for taking a picture following the movement of the swing-up mirror in a manner as to cover the semitransparent portion of the swing-up mirror against light. Due to the fact, there occurs the problem of shortage of the quantity of light incident upon the light-sensing element in particular when the lens aperture is relatively large. Thus, when the lens opening is changed by one step (the value of aperture stopping is multiplied by $1/\sqrt{2}$), the output of the light-sensing element can not change by one step (the output of the element becomes twice larger) at the same time. In other words, the value of aperture and the output of the light-sensing element can not change proportionally in term of step. Therefore, if a picture is taken relying upon the indication made by such metering device, then an over-exposed picture will be produced. This true particularly when the lens opening is relatively large.

A known solution to this problem is to provide a signal pin on the side of lens and a correction mechanism on the side of camera body. The signal pin produces a signal informing of the value of lens aperture or the distance of exit pupil and the correction mechanism receives the signal and corrects the output of the light-sensing element accordingly. However, as will be seen easily, the provision of such additional signal pin on the lens side and such correction mechanism on the camera body side inevitably increases the manufacturing cost and also makes the structure thereof complicate.

SUMMARY OF THE INVENTION

Accordingly, it is an object of the present invention to improve the above described type of TTL metering device containing a second reflecting mirror and to provide a TTL metering device improved with respect to the structure of its second reflecting mirror, which enables to broaden the sensitivity distribution of the light receiving system and also to prevent the output of the light sensing element from being reduced so much.

It is another object of the present invention to provide a TTL metering device of the above described type improved with respect to the structure of second reflecting mirror which enables to change the output of the light-sensing element and the lens aperture proportionally with each other in term of step and which makes it unnecessary to additionally provide a signal pin on the lens side and a correction mechanism on the camera body side as involved in the prior art device.

To attain the above objects according to the invention, the reflecting surface of a second reflecting mirror is so designed that the reflecting surface comprises a central area where a plural number of small reflecting surfaces are assembled together which have a specific multidirectional reflecting characteristics and an area surrounding the central area which forms a reflecting surface having a light concentrating characteristics.

Other and further objects, features and advantages of the invention will appear more fully from the following description taken in connection with the accompanying drawings.

BRIEF DESCRIPTION OF THE DRAWINGS

FIG. 2 shows an embodiment of the second reflecting mirror according to the invention wherein

DETAILED DESCRIPTION OF THE PREFERRED EMBODIMENTS

Figure 1:
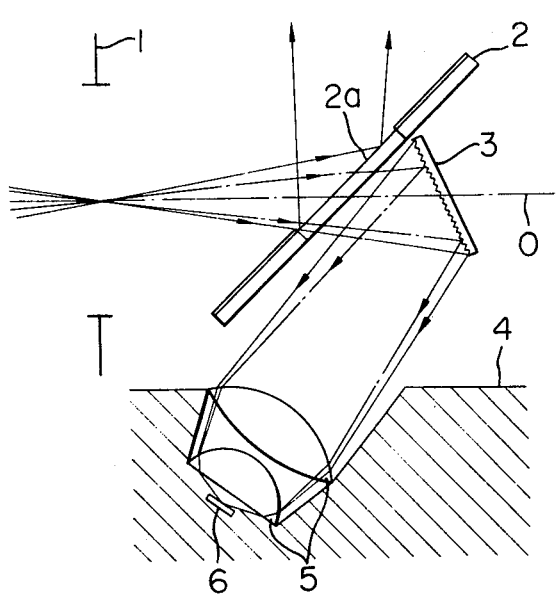
FIG. 1 shows the essential part of a TTL metering device to which the present invention is pertinent, in longitudinal section taken along a plane containing the optical axis of lens.

Referring first to FIG. 1 there is shown the essential part of a TTL metering device in which the present invention is embodied, in longitudinal section taken along a plan containing the optical axis O of the lens. A large portion of light passed through the exit pupil 1 of the lens is reflected upon a swing-up mirror 2 upwardly toward a view finder optical system (not shown) disposed above the mirror as viewed in the drawings. A portion of the light incident upon the swing-up mirror 2 passes through the translucent portion 2a of the mirror 2 and then reaches a second reflecting mirror 3.

The second reflecting mirror 3 is supported on the swing-up mirror in a known manner so that when the swing-up mirror 2 is moved to its retracted position out of the light path for taking a picture upon releasing shutter, the second reflecting mirror 3 also may be brought into a position out of the light path. In this retracted position, the second mirror 3 covers the translucent portion 2a of the swing-up mirror against counter-incident light coming from the view finder optical system so that the film is protected against any exposure to such counter-incident light.

The second reflecting mirror 3 in its first position as shown in FIG. 1 reflects the light passed through the translucent portion 2a of the mirror 2 toward a condenser lens 5 disposed at the bottom 4 of the mirror box. The condenser lens 5 concentrates the light on the light receiving surface of a light-sensing element 6.

Figure 2A:
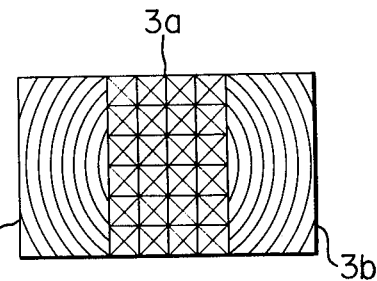
FIG. 2A is a plan thereof and FIG. 2B is a sectional view thereof.
Figure 2B:

FIGS. 2A and 2B show the structure of the second reflecting mirror 3 in detail. The second reflecting mirror 3 comprises two different areas, that is, a central reflection area 3a and a reflection area 3b surrounding the central area 3a. The central reflection area 3a is composed of a plural number of small reflecting surface elements assembled together. Each the reflecting surface element is in a shape of quadrangular pyramid and has a specific reflecting characteristics of four different directions. The surrounding reflecting area 3b has a light-concentrating and reflecting characteristic and is composed of a plural number of ring mirror elements arranged in a fashion of concentric circles surrounding the central area 3a. This arrangement of the reflecting area 3b makes it possible to form the whole second reflecting mirror 3 as a mirror in a form of almost flat plate which is adapted for covering the translucent portion 2a of the swing-up mirror 2.

Figure 3A:
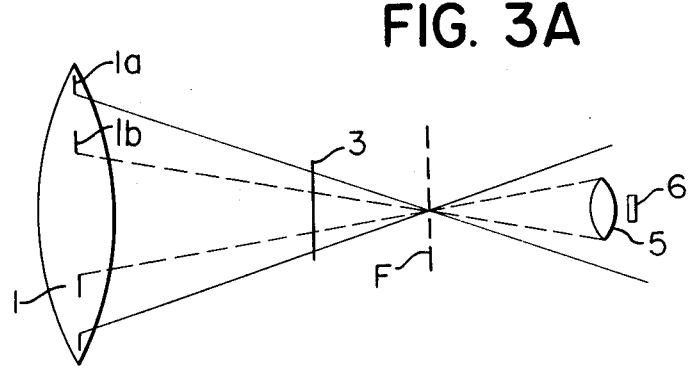
FIGS. 3A, 3B and 3C illustrate the functions of the second reflecting mirror comparing three different second reflecting mirrors with each other.

The function and effect of the second reflecting mirror 3 will be described with reference to FIGS. 3A-3C and 4 while comparing the second mirror 3 according to the invention with the conventional ones. In these figures, the path of light to the light receiving element is extended for the purpose of illustration and the reflecting system is shown as a refractive system. FIG. 3A illustrates the case where a simple plain reflecting surface is used as the second reflecting mirror 3. In this case, there is produced no difference between the quantity of light incident upon the light-sensing element 6 through a larger exit pupil 1a corresponding, for example, to F/1.4 of lens aperture and that of light incident upon the same light-sensing element through a smaller exit pupil 1b corresponding, for example, to F/2. As a result, the light-sensing element senses these two incident lights as being of equal brightness and the output thereof remains unchanged as seen from the curve (a) of FIG. 4. This is caused by the fact that the light-sensing element 6 can not receive all of the light emerged from a larger exit pupil 1a. The condenser lens 5 and the light-sensing element 6 must be mounted within the camera and therefore it is unallowable to use a so much larger light-sensing element enough to receive all of the light.

Figure 3B:
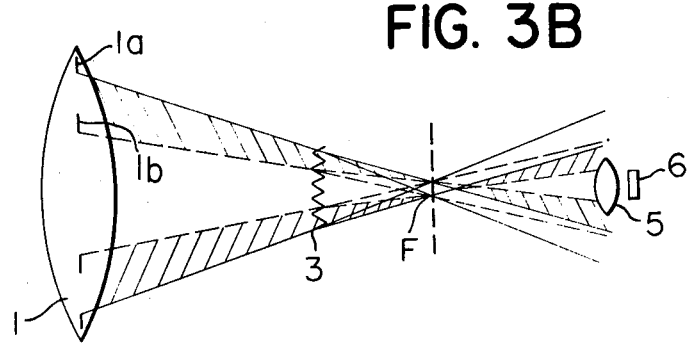

To overcome the above drawback of FIG. 3A case, it has been proposed to design the reflecting surface of a second reflecting mirror 3 not as a simple diffusing reflection surface but as a particular reflecting surface as shown in FIG. 3B, which is composed of a plurality of small reflecting surface elements assembled together each having a specific multi-directional reflecting characteristic. Such type of reflecting mirror adapted for the second reflecting mirror 3 is disclosed, for example, in our prior application, U.S. patent application Ser. No. 716,936 (corresponding to DOS No. 2,639,119). By using such particular reflecting surface there is obtained a broadened light condensing range as compared with the case of FIG. 3A where a simple flat reflecting surface is used. Since the small reflecting surface element has plural flat reflecting surfaces inclined in plural directions, the second reflecting mirror 3 used in the case of FIG. 3B is able to direct also those rays of light to the condenser lens 5 which have such incident angles at which the rays of light could not enter the condenser lens 5 in case of FIG. 3A.

Furthermore, a simple diffusing reflection surface as shown in FIG. 3A and a small reflecting surface as shown in FIG. 3B are different from each other in the following point:

The former only diffuses the incident light. Such effective light which otherwise may enter the condenser lens is also diffused by it uselessly. The diffusing characteristic of the former is not specified. Therefore, the output of the light-sensing element 6 drops down misleadingly. An extension of light condensing range is only the merit of the former.

The reflecting characteristic of the latter is well specified with respect to the direction of reflection. It has a reflecting surface by which the incident light is surely reflected to the condenser lens 5 although a portion of the incident light may be reflected away out of the condenser lens. Since a plurality of such small reflecting surface elements are assembled together to form a second reflecting mirror, a considerable extension of light condensing range can be achieved by using the second reflecting mirror. Furthermore, the distribution of sensitivity may be predetermined as desired by suitably selecting the characteristics of direction of reflection. To some extent it becomes possible to reduce the above described dropping-down of the output of the light-sensing element 6.

Figure 4:
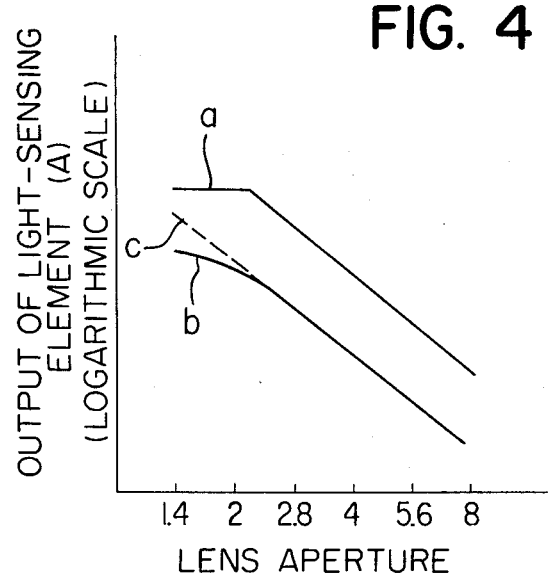
FIG. 4 shows relation curves between lens aperture and output of light-sensing element obtained by the three different second reflecting mirrors shown in FIGS. 3A, 3B and 3C.

For the above reasons, in case of FIG. 3B the light-sensing element 6 can receive also those light rays emerging from the marginal portion of the exit pupil 1a which, in case of FIG. 3A, the element 6 could not receive, and therefore now the output of the light-sensing element 6 can respond to the change in size of the exit pupil in a certain extent as will be understood from the curve (b) of FIG. 4.

However, even in case of FIG. 3B where a plurality of small reflecting surface elements are used to form a specific reflecting surface, the second reflecting mirror can not completely prevent the output of the light-sensing element 6 from dropping down. This is because the second reflecting mirror can reflect those rays toward the condenser lens 5 which are running from the marginal portion of a larger exit pupil 1a to the center F of film plane, but cannot reflect such rays toward the condenser lens 5 which are running to the outside of the center F.

In FIG. 4, the curve (b) of the output is at a level lower than that of the curve (a) as a whole. This is due to only the fact that in case of FIG. 3B the small reflecting surface elements reflect the incident light in plural directions dividing the light as described above.

Figure 3C:
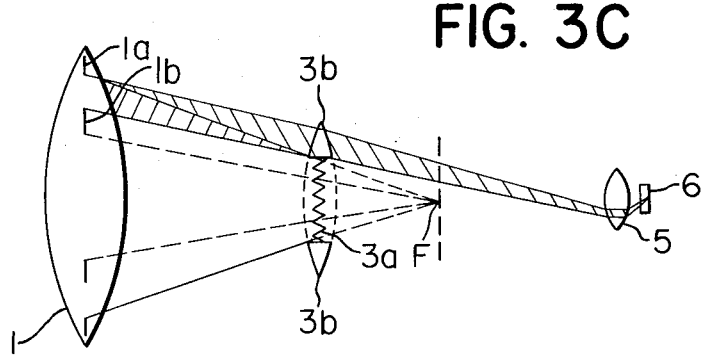

To further improve the effect of a second reflecting mirror 3 as used in FIG. 3B, there is used the second reflecting mirror 3 shown and described with reference to FIG. 2, that is, a second reflecting mirror designed according to the present invention. FIG. 3C illustrates the case where the second reflecting mirror of the invention is used. As clearly seen in FIG. 3C, all the light rays emerging from the marginal portion of a larger pupil 1a are directed to the condenser lens 5 effectively including such light rays running to the center F of film plane and then received by the light-sensing element 6, by virtue of the surrounding reflection area 3b having a light concentrating and reflecting characteristic. Therefore, the light-sensing element 6 can correctly respond the change in size of the exit pupil and as will be understood from the relation curve (c) which is a straight line, the output of the light-sensing element 6 and the value of lens aperture now hold approximately a proportional relation in term of step. Thus, a change of lens aperture by one step (by $1\sqrt{2}$) results in the corresponding change of the output of the light-sensing element by one step (by 2).

Figure 5:
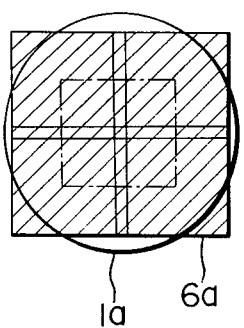
FIG. 5 illustrates a pattern of the light receiving surface of a light-sensing element projected on a large exit pupil through the second reflecting mirror shown in FIG. 2.

FIG. 5 shows a pattern observed when the light receiving surface of the light-sensing element 6 is projected on the larger exit pupil 1a through the second reflecting mirror 3 shown in FIG. 2. The rectangular area 6a marked with slanting lines is the projection of the light receiving surface through the central reflection area 3a of the second reflecting mirror 3. The small rectangular area contained within the area 6a and enclosed by one point chain line suggests a projection of the same light receiving surface as observed for the case of a plane mirror. It is seen that the area 6a has a far larger extension in all directions than that of the area covered through a plane mirror (one point chain line) and covers almost the whole area of the exit pupil. Further, the light-receiving surface is projected on the area surrounding the area 6a through the surrounding reflection area 3b of the second mirror 3. Thus, the light-sensing element 6 can receive light from all-over area of the larger exit pupil 1a. Therefore, the reduction of the output of the light-sensing element caused by the arrangement of small reflecting surfaces is minimized. Also, by virtue of the light concentrating and reflecting surfaces in the surrounding reflection area 3b, the light-sensing element can effectively receive light coming from the marginal portion of the larger exit pupil 1a.

Figure 6A:
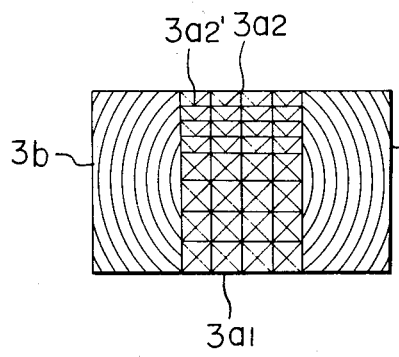
FIGS. 6A, 6B and 7 show planes and other embodiments of the second reflecting mirror according to the invention respectively.
Figure 6B:
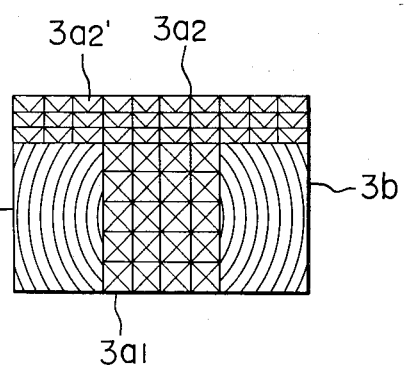

Referring now to FIGS. 6A and 6B, there is shown another embodiment of the second reflecting mirror 3 according to the invention. In this embodiment, the central reflection area 3a is divided into two sections, that is, a first section $3a_1$ and a second section $3a_2$. In the first section, there assemble together a plural number of small reflecting surface elements each having a shape of rectangular pyramid. In the second section, there assemble a plural number of small reflecting surface elements each having a shape of triangular pyramid. The second reflecting mirror 3 is attached to the swing-up mirror 2 (not shown) in such a manner that the second section $3a_2$ may be positioned in the vicinity of the point at which the second reflecting mirror 3 is supported by the swing-up mirror 2. By doing so, light directed to the bottom (ground part) of picture frame is effectively reflected toward the light-sensing element 6 by the reflecting surfaces $3a_2'$ and light directed to the top (sky part) of picture frame is reflected with a reduced efficiency of reflection. Thus, the sensitivity to light received is reduced as for the surplus light at the top of picture frame and thereby a more proper exposure is attained without the exposure being so much affected by the brightness of the top part (sky part).

Figure 7:
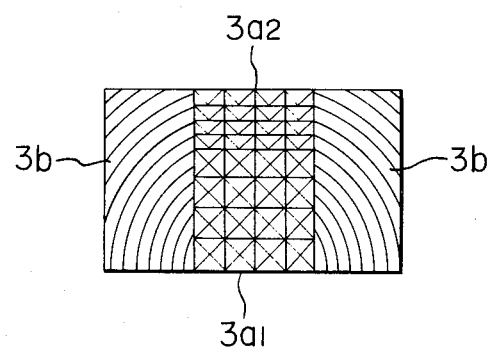

FIG. 7 shows a modification of the embodiment of FIG. 6. In this modification, the center of concentric circles described by the ring mirror elements on the surrounding reflecting area 3a is positioned at the underside of the mirror 3 as viewed in the drawing. The side at which the center is positioned is opposite to the side at which the second section $3a_2$ is formed and therefore the position of the center is remote from the position at which the second mirror 3 is supported by the swing-up mirror 2. This arrangement of the second mirror enables the surrounding reflecting area 3b to concentrate and reflect the light directed to the bottom (ground part) of picture frame toward the light-sensing element 6 effectively. In this manner, the effect obtainable from FIG. 6 embodiment is further increased.

Figure 8:
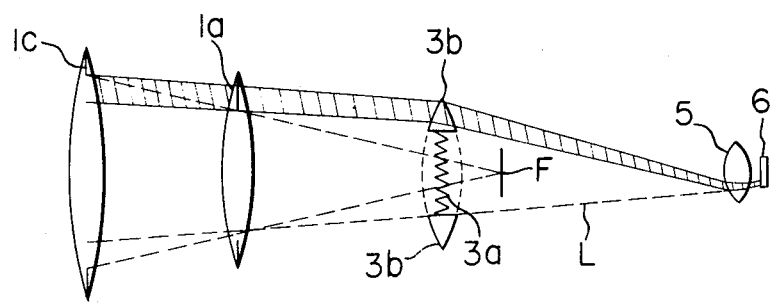
FIG. 8 is an illustrative view of the case where on a TTL metering device designed according to the invention there is mounted an interchangeable lens whose bulb F number is the same to but whose exit pupil distance is different from that of the lens used in the embodiment of FIG. 7.

FIG. 8 illustrates the case where an interchangeable lens of the same bulb F number and a different exit pupil distance is attached to the metering system according to FIG. 7 embodiment.

Exit pupil 1c and exit pupil 1d which is more close to film plane than the pupil 1c have the same bulb F number as will be seen from the fact that the angle that the exit pupil 1c makes to the center F of film plane is equal to the angle of the exit pupil 1d to the center. If a simple diffusing reflection surface is used in a conventional manner, then light cannot effectively fall upon the light-sensing element 6 from the marginal portion of the exit pupil 1c as suggested by the broken line L. As a result, the light-sensing element 6 will perceive the lens with pupil 1c as a lens darker than 1d. The use of light concentrating and reflecting surface 3b overcomes this drawback. The surface 3b can effectively introduce light onto the light-sensing element 6 from the marginal portion of the exit pupil 1c so that 1c and 1d may be perceived by the light-sensing element 6 as of the same brightness. For bulb photo-metering it is essential that two lenses having the same bulb F number should make the light-sensing element produce the same output.

In this manner, when the surrounding reflecting area 3b has a light condensing property throughout the area as shown and described above, the output of light-sensing element can be determined depending solely upon lens aperture (bulb F number) but independently of the distance of lens exit pupil. Therefore, it becomes possible to hold the condition that for the same bulb F number there be produced always the same output of light-sensing element. Moreover, the light concentrating and reflecting area 3b also serves to increase the quantity of light incident upon the light-sensing element. In addition, the surrounding reflecting area 3b gives the metering system a possibility that aperture-light sensing element output characteristic of the metering system is adjusted to that of another type of metering system, for example, such type of metering system in which light is received behind a view finder screen. That two different types of metering systems have the same aperture-output characteristics is particularly advantageous when one and the same interchangeable lens is desired to be useful in common for camera bodies provided with different types of metering systems respectively.

Each reflecting surface of each of the ring mirror elements having a light condensing and reflecting characteristic on the surrounding reflection area 3b which may be spherical, paraboloidal, elliptical, toric or the like. Their combinations also may be used.

The area through which light can be transmitted to the second reflecting mirror 3 may be the above mentioned translucent portion 2a formed by a vapour deposited semipermeable membrane or a plurality of pinholes provided on the reflecting surface of the swing-up mirror 2.

The second reflecting mirror improved according to the invention has various advantages as compared with the prior art ones. When the number of lens aperture is small, it directs the light emerging from the marginal portion of the large exit pupil toward the light-sensing element effectively while dividing the light coming from the central portion of the pupil in a proper manner and directing a certain part of the divided light toward the light-sensing element. Therefore, there is established approximately a proportional relation in term of step between the number of lens aperture at the time of exposure setting at stopping down and the output of the light-sensing element. This makes it unnecessary to additionally provide a signal pin for correction at the lens side and to provide a correction mechanism at the camera body side.

The improved second reflecting mirror also has an effect to widen the sensitivity distribution of the light-sensing system to the extent that the sensitivity distribution becomes approximately equal to that of another type of metering device in which a light-sensing system is disposed behind a finder screen. This makes it possible to use one and the same interchangeable lens in common for different camera bodies equipped with different types of light-sensing systems.

Even when there is used an interchangeable lens which is the same in bulb F number but different in exit pupil distance, the improved second reflecting mirror can direct such light toward the light-sensing element effectively which comes out from the marginal portion of the exit pupil of the lens having a larger exit pupil distance. Therefore, for effecting exposure measurement at open aperture there is no need of providing an additional and particular signal pin at the side of the lens.

While the invention has been particularly shown and described with reference to preferred embodiments thereof, it will be understood by those skilled in the art that the foregoing and other changes in form and details can be made therein without departing from the spirit and scope of the invention.

What I claim is:

1. A TTL metering device in a single lens reflex camera for measuring light passed through the picture taking objective lens of the camera, said metering device comprising:

a light sensing element for receiving the light passed through the picture taking objective lens and producing an output corresponding to the intensity of the light;

a swing-up mirror being rotatably movable between a first position where the light passed through the objective lens is reflected toward a view finder optical system and a second position where said mirror is raised so that said light may reach the film plane, said swing-up mirror partly having a light-transmitting area through which a part of said light may be transmitted toward the film plane when said swing-up mirror is in the first position; and light reflecting means provided behind the swing-up mirror and adapted for directing light beam passed through the objective lens and the light-transmitting area of said swing-up mirror toward the light sensing element, said light reflecting means comprising a reflection area composed of a plural number of mirror elements regularly arranged and having directionally different reflection characteristics and a condensing area of light condensing and reflecting characteristics composed of a plural number of ring mirror elements arranged in a fashion of concentric circles surrounding said reflection area.

2. A TTL metering device as claimed in claim 1, wherein said device further comprises optical means disposed between said light reflecting means and said light sensing element.

3. A TTL metering device as claimed in claim 2, wherein each the mirror element in said reflection area is a plane mirror.

4. A TTL metering device as claimed in claim 3, wherein each the ring mirror element in said condensing area has such light condensing characteristics owing to which the pattern of the light receiving surface of said light sensing element projected on the exit pupil of said picture taking objective lens through said optical means and said ring mirror elements covers the marginal area of said exit pupil.

5. A TTL metering device as claimed in claim 4, wherein each the mirror element in said reflection area has such diffusing characteristics owing to which the pattern of the light receiving surface of said light sensing element projected on the exit pupil of said picture taking objective lens through said optical means and said mirror elements covers almost whole area of said exit pupil.

6. A TTL metering device as claimed in claim 4, wherein said reflection area is formed by a plural number of pyramidally shaped mirror elements regularly arranged.

7. A TTL metering device as claimed in claim 6, wherein the center of concentric circles described by said ring mirror elements lies within said reflection area.

8. A TTL metering device as claimed in claim 6, wherein said ring mirror elements are formed by concave mirrors each having light condensing and reflecting characteristics.

* * * * *